US012409976B2

(12) United States Patent
Yamada et al.

(10) Patent No.: US 12,409,976 B2
(45) Date of Patent: Sep. 9, 2025

(54) METHOD FOR MANUFACTURING OBJECT TO BE PRINTED AND OBJECT TO BE PRINTED

(71) Applicant: TOYO SEIKAN CO., LTD., Tokyo (JP)

(72) Inventors: Koji Yamada, Yokohama (JP); Yukiko Saito, Yokohama (JP); Hironori Ozeki, Yokohama (JP); Shigenobu Murakami, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 662 days.

(21) Appl. No.: 17/765,034

(22) PCT Filed: Aug. 19, 2020

(86) PCT No.: PCT/JP2020/031212

§ 371 (c)(1),
(2) Date: Mar. 30, 2022

(87) PCT Pub. No.: WO2021/065232

PCT Pub. Date: Apr. 8, 2021

(65) Prior Publication Data

US 2022/0371782 A1 Nov. 24, 2022

(30) Foreign Application Priority Data

Sep. 30, 2019 (JP) ................................ 2019-178387
Mar. 2, 2020 (JP) ................................ 2020-034930

(51) Int. Cl.
*B65D 25/34* (2006.01)
*B41M 5/00* (2006.01)
*B65D 1/16* (2006.01)

(52) U.S. Cl.
CPC .......... *B65D 25/34* (2013.01); *B41M 5/0088* (2013.01); *B65D 1/165* (2013.01)

(58) Field of Classification Search
CPC ....... B65D 25/34; B65D 1/165; B41M 5/0088
See application file for complete search history.

(56) References Cited

U.S. PATENT DOCUMENTS 4,165,399 A * 8/1979 Germonprez .......... C09D 11/36 347/100
2008/0079769 A1 4/2008 Yahiro
(Continued)

FOREIGN PATENT DOCUMENTS

CN 101983133 A 3/2011
JP H09-039141 2/1997
(Continued)

OTHER PUBLICATIONS

Search Report in International Application No. PCT/JP2020/031212 dated Nov. 2, 2020, 6 pages.
(Continued)

*Primary Examiner* — James M Mellott
(74) *Attorney, Agent, or Firm* — Marshall, Gerstein & Borun LLP

(57) ABSTRACT

Provided is an object to be printed which can improve the quality of a printed image in inkjet printing on the object to be printed, regardless of the resolution of an inkjet image. In a method for producing an object to be printed having an area to be printed on a surface thereof, a surface of the area to be printed is adjusted so that the area to be printed has a surface energy E (mN/m) of 30 or more and 50 or less. The object to be printed is selected from a can and a film for containers.

7 Claims, 2 Drawing Sheets

(56) References Cited

U.S. PATENT DOCUMENTS

| | | | | |
|---|---|---|---|---|
| 2009/0068481 | A1 | 3/2009 | Yamanaka et al. | |
| 2011/0012974 | A1 | 1/2011 | Niu | |
| 2013/0176358 | A1 * | 7/2013 | Yamada | B41J 3/4073 347/20 |
| 2013/0340885 | A1 * | 12/2013 | Clayton | G01F 23/22 428/29 |
| 2014/0323602 | A1 | 10/2014 | Weigert et al. | |
| 2015/0010722 | A1 | 1/2015 | Yamada et al. | |
| 2015/0353739 | A1 * | 12/2015 | Webster | C09D 11/037 428/209 |
| 2016/0001546 | A1 * | 1/2016 | Hughes | B41F 17/22 101/38.1 |
| 2016/0016687 | A1 * | 1/2016 | Ramsey | B65D 17/4012 347/20 |
| 2019/0163097 | A1 | 5/2019 | Landa | |
| 2020/0254724 | A1 | 8/2020 | Perego et al. | |

FOREIGN PATENT DOCUMENTS

| | | | |
|---|---|---|---|
| JP | 2003-154641 | A | 5/2003 |
| JP | 2006-110828 | A | 4/2006 |
| JP | 2007-055687 | A | 3/2007 |
| JP | 2007-269889 | A | 10/2007 |
| JP | 2008-087327 | A | 4/2008 |
| JP | 2008-188918 | A | 8/2008 |
| JP | 2012-051321 | A | 3/2012 |
| JP | 4903024 | B2 | 3/2012 |
| JP | 2012-086870 | A | 5/2012 |
| JP | 2016-016533 | A | 2/2016 |
| JP | 2016-511776 | A | 4/2016 |
| JP | 2019-520236 | A | 7/2019 |
| JP | 2020-019260 | A | 2/2020 |
| JP | 2020-041018 | A | 3/2020 |
| WO | WO-2013/115302 | A1 | 8/2013 |
| WO | WO-2017/018283 | A1 | 2/2017 |
| WO | WO-2019/072872 | A1 | 4/2019 |

OTHER PUBLICATIONS

Office Action in European Application No. 20872913.7, dated Feb. 11, 2025.

Office Action in JP Application No. 2021-550414 dated Jun. 11, 2024, 12 pages.

Examination Report in Iran Application No. 140150140003000038 dated Apr. 11, 2023, 18 pages.

Office Action in CN Application No. 202080068113.9 dated Jul. 30, 2023, 26 pages.

* cited by examiner

METHOD FOR MANUFACTURING OBJECT TO BE PRINTED AND OBJECT TO BE PRINTED

TECHNICAL FIELD

The present invention relates to a method for producing an object to be printed, and to an object to be printed. More specifically, the present invention provides a method for producing an object to be printed and an object to be printed which can improve the quality of a printed image in inkjet printing on the object to be printed, regardless of the resolution of an inkjet image.

BACKGROUND ART

In producing process of printed cans, patterns or characters are printed on a metal plate that forms a can body, or on a can body after the can body and a bottom are integrally molded. Printing on a metal plate or a can body may be done by plate-printing or inkjet printing. Inkjet printing does not require plate-making, and therefore costs less, and has an advantage that it is possible to change the printing design in a short period of time.

As a printing technology on a print can using inkjet printing, for example, a technology for forming a printed image on a seamless can mounted on a mandrel by sequentially spraying droplets of each ink from inkjet heads corresponding to white (W), yellow (Y), magenta (M), cyan (C), and black (K) inks is disclosed in FIG. 5 of Patent Document 1.

On the other hand, in the case of a recording medium with high liquid repellency, it is difficult to form a solid image with uniform film thickness because droplets merge with each other, and in order to solve such a problem, a technique is disclosed in which the surface energy of a medium to be discharged and the surface energy of a droplet are set in a specific relationship, and the diameter of the landed dot and the maximum distance of the resolution pitch are set in a specific relationship (see Patent Document 2).

PRIOR ART DOCUMENT

Patent Document

Patent Document 1: Japanese Published Unexamined Patent Application No. 2012-86870

Patent Document 2: Japanese Published Examined Patent Application No. 4903024

SUMMARY OF THE INVENTION

Problems to be Solved by the Invention

As a matter to be considered in printing, in addition to forming an image with uniform film thickness as in Patent Document 2, it is also important to suppress degradation of image quality caused by wetting and spreading or repulsion of an ink that forms a printed image. The present invention aims to improve the quality of printed images in inkjet image printing on an object to be printed selected from a can and a film for containers.

Means for Solving the Problems

As a result of the present inventors' studies, the present inventors found that in order to improve the quality of printed images in inkjet printing on an object to be printed selected from a can and a film for containers, it is important to adjust the free energy of an area to be printed on the surface of an object to be printed within a certain range, regardless of the resolution of an inkjet image.

The present invention is a method for producing an object to be printed having an area to be printed on a surface thereof, wherein the object to be printed is selected from a can and a film for containers, and the method includes a surface adjustment step of adjusting the area to be printed so that the area to be printed has a surface energy E (mN/m) of 30 or more and 50 or less.

Preferably, in the surface adjustment step, a receiving layer is formed on at least a portion of the area to be printed, and examples of the receiving layer preferably include a void-type receiving layer and a swelling-type receiving layer.

Preferably, the receiving layer contains a base resin selected from the group consisting of an acrylic resin, a polyester resin, an epoxy resin, and a blend of these resins, preferably, the receiving layer is in a semi-cured state, and preferably, the receiving layer contains titanium oxide.

Preferably, in the surface adjustment step, at least a portion of the area to be printed is treated by a surface modification means.

One embodiment may include a printing step of forming an inkjet image on the area to be printed of the object to be printed which is produced by the above-described production method, and in a preferable embodiment, the printing step includes an image formation step of forming the inkjet image on an image carrier means, and a transfer step of transferring the inkjet image formed on the image carrier means to the area to be printed.

Another embodiment of the present invention is an object to be printed, which is a can or a film for containers and has an area to be printed on a surface thereof, wherein the area to be printed has a surface energy E (mN/m) of 30 or more and 50 or less.

Preferably, the area to be printed includes a receiving layer on a surface thereof, and the receiving layer includes titanium oxide.

Advantageous Effects of Invention

The present invention can improve the quality of a printed image in inkjet printing on an object to be printed, regardless of the resolution of an inkjet image.

DESCRIPTION OF EMBODIMENTS

Figure 1:
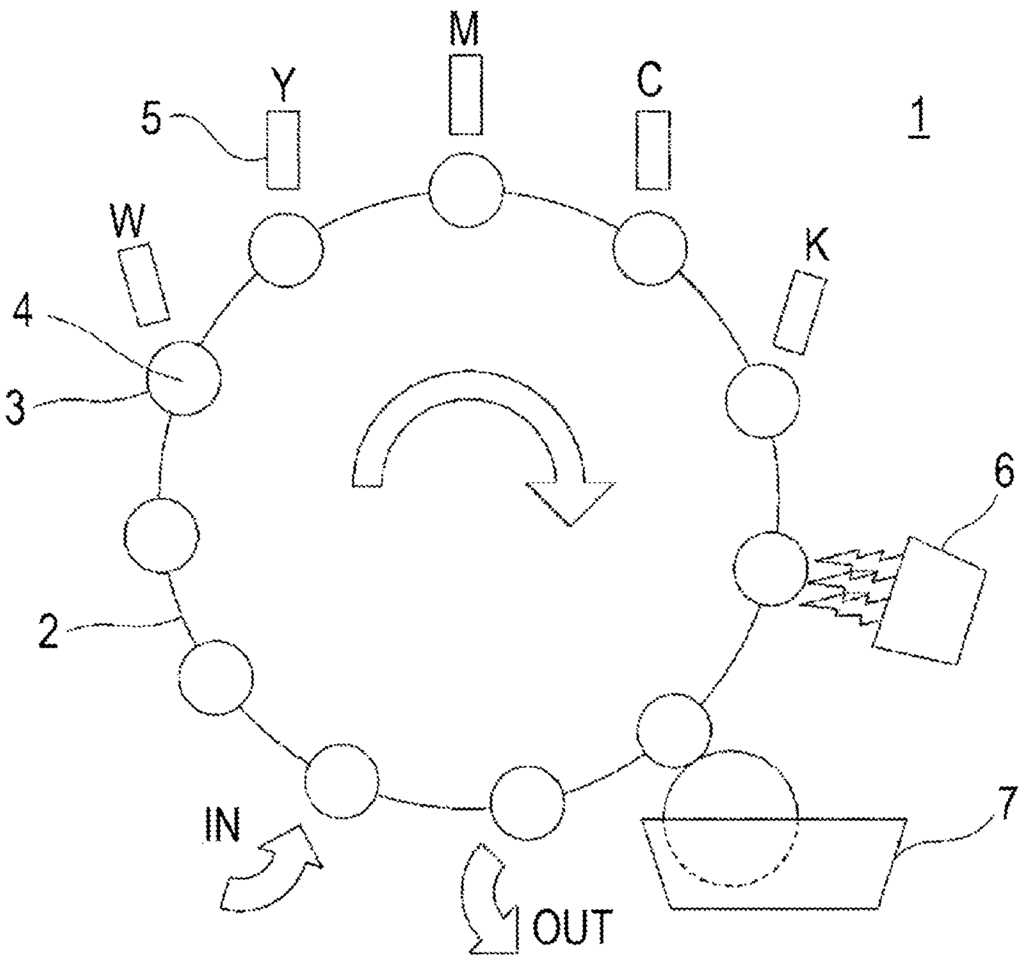
FIG. 1 is a schematic diagram illustrating one example of the configuration of a printing system.

One embodiment of the present invention is a method for producing an object to be printed having an area to be printed on a surface thereof, the method including a surface adjustment step of adjusting the area to be printed so that the area to be printed has a surface energy E (mN/m) of 30 or more and 50 or less.

The object to be printed is selected from cans and films for containers, which are susceptible to ink wetting and spreading or ink repulsion. The films for containers are not limited as long as they are used for containers, and may be used for pouches or and may be films for labels.

In the present embodiment, when printing an inkjet image on an object to be printed, such as a can, the surface energy E (mN/m) of the area to be printed of the object to be printed is adjusted to the above-described range in order to improve the quality of the image to be printed. In inkjet image printing, the diameter of an inkjet ink droplet that lands on the area to be printed from an inkjet nozzle can be made difference depending on the resolution of an inkjet image to be printed, and the present inventors have found that the surface energy of the area to be printed is important to improve the quality of an image to be printed regardless of the diameter of the inkjet ink droplet that lands, namely, regardless of the resolution of the inkjet image.

When the surface energy E is less than 30 mN/m, the surface of an area to be printed is less likely to be wetted, causing ink droplets to be excessively repelled, resulting in lower image quality. On the other hand, when the surface energy is greater than 50 mN/m, the surface of an area to be printed is likely to be wetted, causing ink droplets to bleed easily, resulting in ambiguous image contours, and cloudy colors, resulting in poor image quality. The surface energy E is preferably 35 mN/m or more and 50 mN/m or less.

In the present embodiment, the quality of an image to be printed can be improved regardless of the diameter of an inkjet ink droplet to be landed, namely, regardless of the resolution of an inkjet print image, however, the resolution of an inkjet print image is usually, but not limited to, 300 dpi or higher.

An area to be printed to be adjusted in the surface adjustment step may be the entire surface of a can, or a portion of the surface of a can. When a portion of the surface of a can is adjusted, it is preferable to adjust an area to be printed where inkjet printing is applied.

In the present embodiment, in order to make the surface free energy E of an area to be printed in the surface adjustment step to be in the above-described suitable range, for example, a method of providing a receiving layer onto at least a portion of an area to be printed, a method of modifying at least a portion of an area to be printed by a surface modification means, or the like may be used, but are not limited thereto.

The receiving layer is a layer that enables inkjet printing on a material where inkjet printing is unavailable or difficult. Typically, there is a swelling-type receiving layer with a transparent surface and a void-type receiving layer with a whitish surface.

The swelling-type receiving layer is composed of a resin that easily absorbs inks, and the absorbed inks swell a resin layer and stay in the receiving layer, which enables printing.

A base resin included in the swelling-type receiving layer is not limited as long as the resin easily absorbs inks, and examples thereof include an acrylic resin, a polyester resin, an epoxy resin, a vinyl resin, a urethane resin, and a blend of these resins. It is preferable to include one or more selected from an acrylic resin, a polyester resin, an epoxy resin, a urethane resin, and a blend resin of these. When making a blend resin, the ratio of each resin is not particularly limited, and a blend of two types of resins or a blend of three or more types of resins may be used.

The swelling-type receiving layer may contain a resin other than these as long as the function is not inhibited.

A base resin contained in the swelling-type receiving layer is preferably in a semi-cured state, since a function of absorbing ink and swelling may be degraded when the resin is cured.

The void-type receiving layer contains inorganic fine particles to form voids, which allow inks to penetrate the voids and remain in the receiving layer, which enables printing. Inorganic fine particles contained in the void-type receiving layer are not limited as long as the particles can form voids, and examples thereof include silica, alumina, titania (titanium oxide), and boron nitride, and inorganic particles are preferably selected from silica and alumina.

The particle size of the inorganic particles is not particularly limited, and the average primary particle size is usually 10 nm or more, may be 50 nm or more, and is usually 50 μm or less. The average primary particle size can be determined from results of particle size distribution measurement using a laser diffraction/scattering particle size distribution analyzer, or the like, and catalog values may also be used for commercially available products.

The thickness of the receiving layer is not particularly limited and can be set by those skilled in the art.

The receiving layer may contain a white pigment, such as titanium oxide, zinc sulfide, zinc oxide (zinc sublimation), or lithopon (zinc sulfide+barium sulfate), and titanium oxide is particularly preferred. By containing a white pigment in the receiving layer, a design pattern layer formed on the receiving layer can be recognized more clearly.

The method of modifying the surface by a surface modification means is not particularly limited as long as an area to be printed can be modified and the surface free energy E can be set within the above range, and examples thereof include performing surface modification by blowing a combustion flame containing a silicon compound. By blowing a combustion flame containing a silicon compound, a silicon oxide film can be formed on an area to be printed, and surface free energy E that can satisfy the above-described range can be achieved.

The silicon compound is not particularly limited, and typical examples thereof include, but are not limited to, a silane compound such as alkylsilane or alkoxysilane. These silane compounds may have nitrogen, a halogen such as chlorine, a vinyl group, an amino group, and the like.

As a surface modification means, corona treatment, plasma treatment, glow discharge treatment, arc discharge treatment, or the like, may be used.

By adjusting the above-described area to be printed, an effect of improving ink adhesion to the object to be printed is also exhibited.

After producing an object to be printed by the production method of the present embodiment, when the object to be printed is a can, the production method may include a printing step of printing an inkjet image on the can. When the object to be printed is a film for containers, the method may include a printing step of printing an inkjet image on the film for containers. The printing step is not particularly limited, and inkjet printing may be performed directly from an inkjet nozzle to an area to be printed on the surface of a can or a film for containers, and the printing step may be offset printing in which an inkjet image is printed once from an inkjet nozzle onto a blanket or the like, and then the inkjet image is transferred to an area to be printed. An example of an inkjet printing system to which an embodiment of the present invention can be applied will be described below.

FIG. 1 is a schematic diagram illustrating the configuration of an inkjet printing system 1 that forms an inkjet image on an area to be printed on the surface of a can.

When printing on at least the outer surface of the body of a seamless can, a printing system in which a seamless can is rotatably fixed to a mandrel formed on a mandrel wheel, and inkjet printing is performed by a printing station installed along the mandrel wheel, has excellent productivity. In the inkjet printing system 1, a plurality of mandrels 3 are evenly arranged on a mandrel wheel 2, and the mandrel wheel 2 revolves clockwise intermittently, while the mandrels 3 rotate clockwise at each station. As a can 4 mounted on the mandrel 3 is carried along arrows, images are printed by a plurality of nozzle heads 5 that discharge ink of respective white (W), yellow (Y), magenta (M), cyan (C), and black (K) colors. The order of the colors is not limited, and the ink colors are not limited thereto. Therefore, clear ink may be used. Two inkjet printheads may be installed in each printing station, and by using such a configuration, the printing speed can be increased and the resolution can be increased by increasing the dot density, and the thickness of the ink can be increased by overlaying dots with high precision, thereby obtaining a printed image with a feeling of high density. The type of ink is not particularly limited, and may be an aqueous ink or a UV curable ink.

The can 4 on which an image has been printed is temporarily baked by a temporary baking unit 6, and then varnish is applied to the surface of the can by a varnishing apparatus 7, thereby producing a printed can.

In the printing system 1, a receiving layer forming means (including a coating means and a receiving layer drying means) that forms a receiving layer on the surface of a can may be installed, and a surface modification means that performs surface modification of the surface of a can may be installed. For example, a receiving layer forming means or a surface modification means may be installed upstream of the nozzle head 5.

A receiving layer forming means or a surface modification means may be installed in a process before entering the printing system 1.

Figure 2:
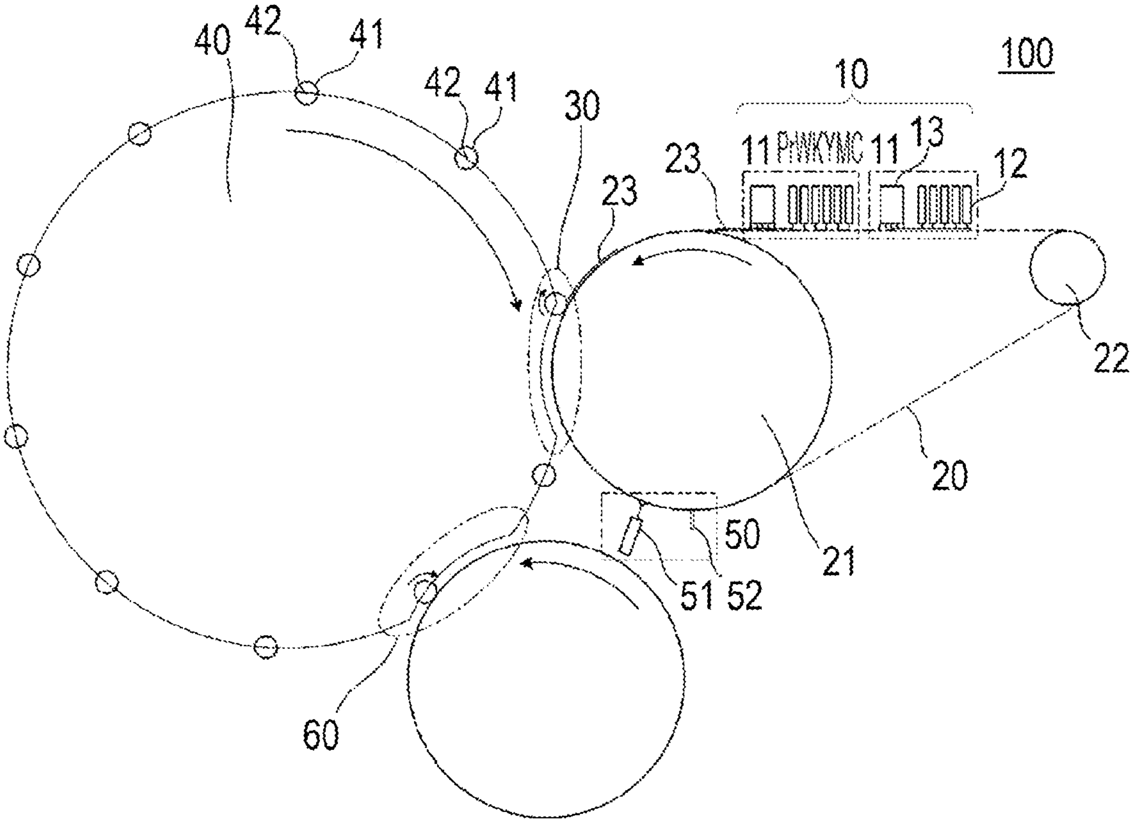
FIG. 2 is a schematic diagram illustrating another example of the configuration of a printing system.

FIG. 2 is a schematic diagram illustrating the configuration of the inkjet printing system 100.

The inkjet printing system 100 include: a printing station 10, which is an image forming means; a carrying belt 20, which is an image carrier means; a transfer station 30, which is a transfer means; a mandrel wheel 40 and a mandrel 42, which are can carrying means; a cleaning station 50, which is a cleaning means; and an overcoat station 60, which is a coating means. The inkjet printing system 100 may have other configurations than the above.

The printing station 10 includes a printing unit 11, and an inkjet printer head provided by the printing unit 11 forms an inkjet image 14 (not illustrated) on a blanket 23 provided by the carrying belt 20. The printing station 10 may include only one printing unit 11, or may include a plurality of printing units 11. When a plurality of printing units 11 are used, it is possible to support high-speed printing and printing methods with a large number of paths, thereby improving the quality of printed images and forming high-definition inkjet images 14 on the blanket 23.

The inkjet printer head provided by the printing unit 11 typically includes a plurality of nozzle heads 12 that discharge inks of white (W), black (K), yellow (Y), magenta (M), and cyan (C) colors, respectively. The order of the colors is not limited, and the colors of the inks are not limited thereto. Therefore, clear ink may also be used.

The printing unit 11 may include a nozzle bed that discharges a primer layer (Pr), in such case, the nozzle bed is located downstream of an inkjet printer head to cover the formed inkjet image 14 with the primer layer.

The printing unit 11 may further include a UV irradiation unit 13 as a curing means. When the ink discharged by the inkjet printer head is a UV-curable ink, by semi-curing the ink by UV irradiation, ink residue that may occur when the inkjet image 14 is transferred to a can 41 at a transfer station can be suppressed.

The unit may include a drying means as a curing means in place of the UV irradiation unit 13. The drying means can semi-cure the inkjet image 14 by such a method as blowing warm air to the inkjet image.

The carrying belt 20 is annular via a first roller 21 and a second roller 22, and by circulating in the arrow direction in the Figure, an inkjet image printed on the blanket 23 of the carrying belt 20 is carried to the transfer station 30. The number of blankets 23 on the carrying belt 20 can be determined according to the circumference length of the annular carrying belt and according to the operating speed of a printing system.

The carrying belt 20 may have flexibility, but when the material has excessive flexibility, the tension of the belt may be insufficient and misalignment may occur during printing or transfer. The material of the carrying belt 20 is not particularly limited.

For the purpose of guiding the carrying belt, there may be one or a plurality of auxiliary rollers other than the first roller 21 and the second roller 22.

The blanket 23 on which the inkjet image 14 is formed is carried along the periphery of the first roller 21 to the transfer station 30. On the other hand, a plurality of cans 41 are carried by the mandrel wheel 40 to the transfer station 30. When the tip of the blanket 23 comes into contact with the carried can 41, or immediately before comes into contact with the can 41, the can 41 starts to rotate, and after contact, the inkjet image 14 formed on the blanket 23 is transferred in the circumferential direction of the can 41 to form an inkjet image on the surface of the can 41. The blanket 23 and the can 41 may be aligned as appropriate, and the alignment may be performed in a known manner.

When the tip of the blanket 23 comes into contact with the carried can 41, the revolution of the mandrel wheel 40 itself may be stopped, the can 41 on the mandrel 42 may be rotated while the mandrel wheel 40 is stopped, and the inkjet image 14 formed on the blanket 23 may be transferred to the can 41. This embodiment may also be applied to such intermittent printing.

After the inkjet image 14 has been transferred from the blanket 23 to the surface of the can 41 at the transfer station 30, the blanket 23 may have the surface cleaned at the cleaning station 50. In the present embodiment, since it is possible that not all of the ink may be transferred to the blanket 23, a cleaning station 50 may be provided to wash the ink on the blanket 23.

The cleaning station 50 typically includes a cleaning agent supply unit 51 that discharges a cleaning agent onto the blanket 23 and a scraper 52 that wipes off the ink on the blanket 23. The blanket 23, whose surface has been cleaned in the cleaning station 50, is guided by the second roller 22 and carried again to the printing station 10, where the inkjet image 14 is formed thereon.

The can 41 on which the inkjet image 14 has been transferred is carried to an overcoat station 60 by the mandrel wheel 40. At the overcoat station 60, the inkjet image 14 transferred onto the surface of the can 41 is coated. Although varnish is typically used for the coating, another material may be used as long as the material can protect an inkjet image and improve the durability, and no varnish may be applied over the inkjet image 14.

In the printing system 100, a receiving layer forming means (including a coating means and a receiving layer drying means) that forms a receiving layer on the surface of a can may be installed, and a surface modification means that performs surface modification of the surface of the can may be installed. For example, a receiving layer forming means and a surface modification means may be installed upstream of a transfer station of the can carrying means.

Needless to say, the printing system 100 may be used to pre-print cans.

EXAMPLES

In the following, results of confirming the relationship between the surface energy E (mN/m) of a can and the quality of a printed image during inkjet image printing are specifically described.

A can as an object to be printed was prepared by integrally molding an aluminum can body and a can bottom.

The prepared can was subjected to a treatment shown in Table 1 below, and the surface energy E of the can was measured. The surface energy E was measured using a contact angle meter (DropMaster DM500 manufactured by Kyowa Interface Science Co., Ltd.).

<Measurement Method of Surface Energy>

Two liquids with known surface energies (water and diiodomethane) were used to measure the respective contact angles of the surface of a target substrate using a contact angle meter. From the Kaelble-Uy's theoretical equation, the surface energy of the target substrate surface was obtained. The results are shown in Table 1.

Inkjet image printing was performed on the treated cans using the printing system 1 in FIG. 1. The printing results (visually observed) are shown in Table 1. The evaluation was performed according to the following evaluation criteria.

<Evaluation Criteria>

A: The printed image was very clear.

B: The outline of the image was a little unclear, but the image was sufficiently recognizable.

C: The image was unclear.

TABLE 1

| Examples/ Comparative Examples | Surface Treatment | Surface Energy (mN/N) | Resolution (dpi) | Evaluation |
|---|---|---|---|---|
| Example 1 | Swelling-type receiving layer: Acrylic resin | 40 | 600 | A |
| Example 2 | Swelling-type receiving layer: Acrylic resin | 50 | 300 | A |
| Example 3 | Void-type receiving layer: Silica | 38 | 600 | A |
| Example 4 | Flame Bond treatment | 35 | 600 | A |
| Example 5 | Corona treatment | 35 | 600 | A |
| Example 6 | Flame treatment | 35 | 600 | A |
| Comparative Example 1 | Corona treatment | 55 | 300 | B |
| Comparative Example 2 | Corona treatment | 55 | 600 | C |
| Comparative Example 3 | No treatment | 28 | 300 | C |
| Comparative Example 4 | No treatment | 28 | 600 | C |

From these results, regardless of the resolution, when the surface energy E of a can was in a specific range, a printed inkjet image became clearer and provided inkjet image printing of favorable quality on the surface of the can.

The invention will be described in detail with reference to specific examples, but it is clear to those skilled in the art that various changes and modifications can be made without departing from the purpose and scope of the invention.

REFERENCE SIGNS LIST

- 1 Inkjet printing system
- 2 Mandrel wheel
- 3 Mandrel
- 4 Can
- 5 Nozzle head
- 6 Temporary baking unit
- 7 Varnishing apparatus
- 100 Inkjet printing system
- 10 Printing station
- 11 Printing unit
- 12 Nozzle head
- 13 UV irradiation unit
- 14 Inkjet image
- 20 Carrying belt
- 21 First roller
- 22 Second roller
- 23 Blanket
- 30 Transfer station
- 40 Mandrel wheel
- 41 Can
- 42 Mandrel
- 50 Cleaning station
- 51 Cleaning agent supply unit
- 52 Scraper
- 60 Overcoat station

The invention claimed is:

1. A method for producing an object to be printed comprising an area to be printed on a surface thereof, wherein:

the object to be printed is selected from a can and a film for containers, the method comprises a surface adjustment step of adjusting a surface of the area to be printed so that the area to be printed has a surface energy E (mN/m) of 30 or more and 50 or less, the surface adjustment step comprises forming a receiving layer on at least a portion of the area to be printed, and the receiving layer is a swelling-type receiving layer in a semi-cured state or a void-type receiving layer.

2. The method for producing an object to be printed according to claim 1, wherein the receiving layer comprises a base resin selected from the group consisting of an acrylic resin, a polyester resin, an epoxy resin, a urethane resin, and a blend of these resins.

3. The method for producing an object to be printed according to claim 1, wherein the receiving layer comprises titanium oxide.

4. The method for producing an object to be printed according to claim 1, wherein the void-type receiving layer is in a semi-cured state.

5. The method for producing an object to be printed according to claim 1, wherein in the surface adjustment step, at least a portion of the area to be printed is treated by a surface modification means.

6. A method for producing a printed material, the method comprising: a printing step of forming an inkjet image on the area to be printed of the object to be printed which is produced by the method according to claim 1.

7. The method for producing a printed material according to claim 6, wherein the printing step comprises an image formation step of forming the inkjet image on an image carrier means; and a transfer step of transferring the inkjet image formed on the image carrier means to the area to be printed.

* * * * *